J. BOYERS.
Coffee-Pot.
No. 162,347.
Patented April 20, 1875.
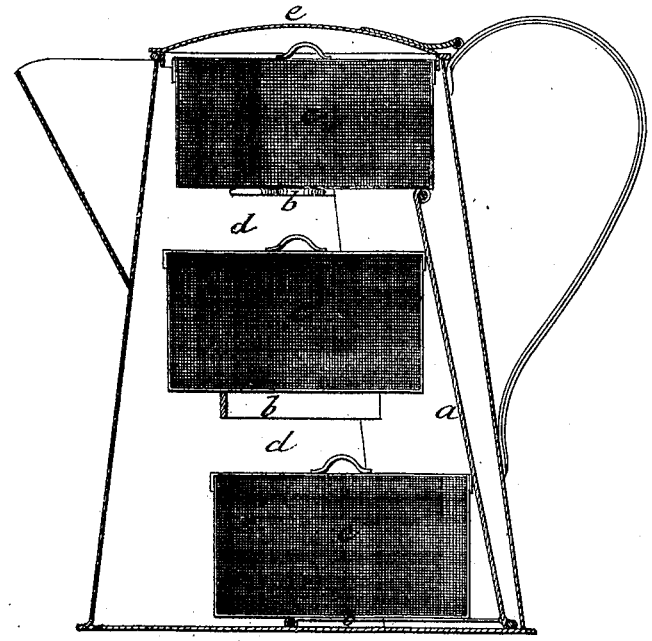
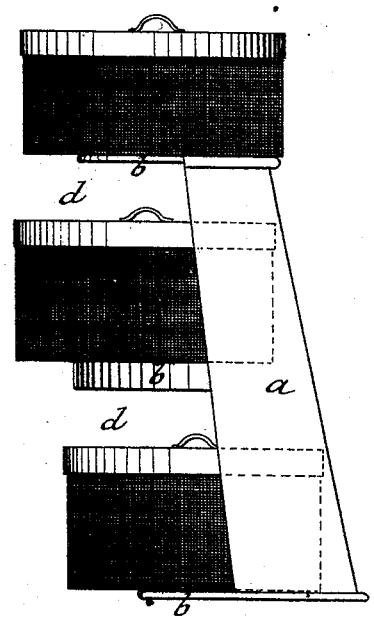
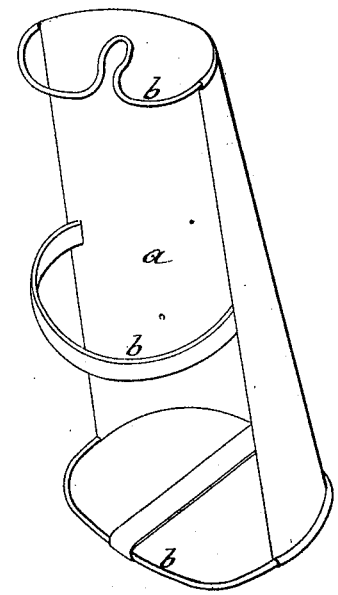

UNITED STATES PATENT OFFICE.

JACOB BOYERS, OF HUNTINGTON, INDIANA.

IMPROVEMENT IN COFFEE-POTS.

Specification forming part of Letters Patent No. 162,347, dated April 20, 1875; application filed March 8, 1875.

*To all whom it may concern:*

Be it known that I, JACOB BOYERS, of Huntington, in the county of Huntington and State of Indiana, have invented certain new and useful Improvements in Coffee-Pots and Method of Making Coffee; and I do hereby declare that the following is a full, clear, and exact description thereof, which will enable others skilled in the art to which it pertains to make and use the same, reference being had to the accompanying drawings and to the letters of reference marked thereon, which form a part of this specification.

The object of my invention is to make a pure, clear, and highly-flavored coffee, and to effect in the process a saving of about one-fourth the cost of the coffee. This I accomplish by the combination, with the boiler, of a series of percolators for the ground coffee, arranged one above the other, with intervening spaces to afford free access for boiling and steaming the coffee in separate holders, placed in line with each other, and extending from the bottom to the top of the boiler. My invention further consists in the combination, with the boiler and the percolators, of a stand, consisting of a side-curved plate and horizontal skeleton shelves, the function of said plate being to direct the boiling fluid and steam through the percolators by upward currents, and the shelves to form supports thereto, in vertical line within the boiler, from the bottom to the top thereof, and made removable therefrom with said stand, to allow them to be interchanged from a lower to a higher position, and from the top to the bottom, in the process of making separate drawings of coffee.

In the accompanying drawings, Figure 1 represents a vertical section of a coffee-boiler embracing my invention; Fig. 2, a detached view of the removable stand with the percolators in position, and Fig. 3 the removable shelved stand.

The stand for the percolators consists of a plate, *a*, bent so as to form a half-pipe, tapering to the top, and provided with skeleton-shelves *b*, which extend horizontally from the concave side to support thereon in line, one above the other, a series of percolators, *c*, for containing the drawings of the coffee, and between these percolators there are spaces *d*, to allow free course for the boiling fluid around and between each percolator. The half-pipe stand-plate is open at top and bottom, but it forms a closed side to the percolators, and serves thereby to direct the boiling fluid and steam through the percolators, by forming rising currents within the concave. This half-pipe is of a size that it can be lifted out of the boiler, with the percolators upon its shelves, to allow of the removal or interchanging of the percolators, as may be desired. The percolators are perforated tin cups, with lids to confine the drawings of the coffee. In the drawings I have shown three of such percolators, as I have found that this number is the best for carrying out my process, which, to obtain the best effect, requires three stations for the separate action upon the grounds at the bottom, middle, and top of the boiler. The upper station is directly under the boiler-lid *e*, and the stand must be of such a height as to bring the upper percolator within a short distance of the top of the boiler, while the tapering form of the half-pipe stand gives to the boiling fluid a pressure within the concave, and forces the fluid out through the sides and bottoms of the percolators.

In arranging the percolators one above the other the grounds in each are kept separate, and undergo boiling from the bottom to the top of the pot, the two lower ones giving out strength and flavor according to the condition of the grounds, while the top one is storing up the waste strength and flavor at the top, to be again given out at the bottom.

The process of making coffee is as follows: In the first drawing I use but one percolator upon the bottom shelf of the stand. At the second drawing this percolator is raised to the middle shelf, and a percolator with a fresh drawing put in the bottom. In this second drawing there is one fresh-filled percolator, and at the same time the first one is undergoing a second boiling midway between the top and bottom of the boiler. In the third drawing a fresh-filled percolator is placed at the bottom, and the middle one raised to the top shelf, so that each time the bottom one is raised it is boiled a second time. At this third boiling the top percolator does not give out any strength to the coffee, but rather gathers and holds the rich essence of the coffee which concentrates at the top in steam and vapor, and which would be otherwise lost. In the fourth drawing, therefore, the top percolator is transferred to the bottom, where it gives out the rich flavor and strength it absorbed at the top, the others, of course, being raised in succession to the middle and top of the stand. In this way each cup of boiled grounds is passed through the pot in regular order from the bottom to the top, and returned to the bottom. The exhausted cup of grounds is always kept at the top of the boiler, where it absorbs the rich fluid rising up with the steam, and thus becomes almost as efficient as a fresh drawing when brought to the bottom. In no case are the grounds thrown away until after this fourth boiling. This economy may be continued, if desired, until all the strength is fully extracted from the grounds; and by the process of interchanging percolators a superior and clear coffee is produced.

I claim—

1. The combination, with the boiler, of a series of separate percolators, $c$, for the coffee, arranged one above the other from the bottom to the top of the boiler, and having the spaces $d$ between them, substantially as and for the purpose herein set forth.

2. The combination, with the boiler and the percolators $c$, of a curved stand-plate, $a$, and shelves $b$, substantially as and for the purpose herein set forth.

In testimony that I claim the foregoing I have affixed my signature in presence of two witnesses.

JACOB BOYERS.

Witnesses:
B. F. VANCAMP,
J. L. VANCAMP.